US008604104B2

(12) United States Patent
Fengler et al.

(10) Patent No.: US 8,604,104 B2
(45) Date of Patent: Dec. 10, 2013

(54) CELLULOSE ETHER COMPOSITION FOR DRY MORTAR FORMULATIONS

(75) Inventors: Lars Fengler, Lower Saxony (DE); Rene Kiesewetter, Lower Saxony (DE)

(73) Assignee: Dow Global Technologies LLC, Midland, MI (US)

( * ) Notice: Subject to any disclaimer, the term of this patent is extended or adjusted under 35 U.S.C. 154(b) by 160 days.

(21) Appl. No.: 13/106,017

(22) Filed: May 12, 2011

(65) Prior Publication Data

US 2011/0281970 A1    Nov. 17, 2011

Related U.S. Application Data

(60) Provisional application No. 61/395,705, filed on May 17, 2010.

(51) Int. Cl.
*C08J 3/20* (2006.01)
*C08L 1/26* (2006.01)
*C08F 8/00* (2006.01)

(52) U.S. Cl.
USPC ............... 524/42; 524/43; 523/351; 525/55; 525/221

(58) Field of Classification Search
USPC ........ 523/351; 524/5, 42–43, 46; 525/55, 221
See application file for complete search history.

(56) References Cited

U.S. PATENT DOCUMENTS

| 4,447,267 | A | * | 5/1984 | Chesney et al. | 106/720 |
| 5,749,964 | A | * | 5/1998 | Mann | 106/805 |
| 6,709,508 | B2 | * | 3/2004 | Dietrich et al. | 106/724 |
| 8,314,170 | B2 | * | 11/2012 | Dietrich et al. | 524/200 |
| 2004/0035867 | A1 | | 2/2004 | Schultz et al. | |
| 2004/0242760 | A1 | | 12/2004 | Shibai et al. | |
| 2005/0014881 | A1 | | 1/2005 | Weitzel et al. | |
| 2006/0293417 | A1 | | 12/2006 | Taniguchi et al. | |
| 2007/0221098 | A1 | * | 9/2007 | Wolbers et al. | 106/656 |
| 2009/0018240 | A1 | * | 1/2009 | Becker et al. | 524/5 |

FOREIGN PATENT DOCUMENTS

| CN | 1587313 | | 3/2005 |
| CN | 1821491 | A | 8/2006 |
| CN | 101244915 | A | 8/2008 |
| EP | 0692465 | A1 | 1/1996 |
| EP | 0747331 | A1 | 12/1996 |
| EP | 1743877 | A1 | 1/2007 |
| JP | 2002234764 | A | 8/2002 |
| JP | 2003342051 | A | 12/2003 |
| JP | 2004244255 | | 9/2004 |
| JP | 2005162508 | A | 6/2005 |
| JP | 2006104057 | A | 4/2006 |
| JP | 2006176380 | A | 7/2006 |
| JP | 2007210877 | A | 8/2007 |
| KR | 100704727 | B1 | 4/2007 |
| RU | 2255069 | C1 | 6/2005 |

OTHER PUBLICATIONS

Machine Translation of JP 2004/244255.*
"Mighty 21 PSN." KAO Chemical Europe, p. 1, May 2003.*

* cited by examiner

*Primary Examiner* — Hannah Pak
(74) *Attorney, Agent, or Firm* — Steven W. Mork

(57) ABSTRACT

The present invention relates to a cellulose ether composition for use in the preparation of dry mortar formulations, especially of cementitious bound tile adhesives (CBTA). The invention further relates to a dry mortar formulation comprising said cellulose ether composition. Furthermore, the invention is directed to a method of improving the slip resistance of a dry mortar formulation without deteriorating the mechanical strength and the open time of the cured dry mortar formulation.

7 Claims, No Drawings

CELLULOSE ETHER COMPOSITION FOR DRY MORTAR FORMULATIONS

This application claims the benefit of priority under 35 U.S.C. §119(e) of U.S. Provisional Patent Application No. 61/395,705 filed on May 17, 2010. The present invention relates to a cellulose ether composition for use in the preparation of dry mortar formulations, especially of cementitious bound tile adhesives (CBTA). The invention further relates to a dry mortar formulation comprising said cellulose ether composition. Furthermore, the invention is directed to a method of improving the slip resistance of a dry mortar formulation without deteriorating the mechanical strength and the open time of the cured dry mortar formulation.

FIELD OF THE INVENTION

Tile adhesives, for example, are used to install tiles in residential and commercial buildings on floors or on walls. Depending on the local construction technology, regional needs and building traditions, the choice of the raw material and the performance criteria as well as the norms and guidelines for testing the adhesives can differ from country to country.

Beside the mentioned differences important performance criteria are in any case the tensile adhesion strength, the open time and the slip resistance. The slip resistance is an important feature for a cement based tile adhesive for tiling as well as for other dry mortar applications. A good slip resistance for mortars is necessary when installing tiles on non-horizontal areas and, of course, on vertical surfaces.

However, not only CBTAs are concerned. The foregoing in principle applies to all dry-mortar formulations where slip is an issue, e.g. where the product is applied on vertical substrates. Therefore, also hand or machine applied gypsum plaster, cement renders, water proofing membranes, mineral coatings for insulation systems like ETICS (=external insulation composite systems) are concerned.

The problem addressed by the invention was to provide a dry-mortar formulation, e.g. a cementitious bound tile adhesive, having at least an improved slip resistance with at least an acceptable open time and/or an acceptable mechanical strength, e.g. in terms of tensile adhesion strength, of the cured dry-mortar formulation. A further problem addressed by the invention was to provide a modifying composition (i.e. a modifier composition) which can be added to a standard dry-mortar formulation, e.g. a cementitious bound tile adhesive, wherein the modifier composition imparts the standard dry-mortar formulation with at least an improved slip resistance with at least an acceptable open time and/or an acceptable mechanical strength of the cured dry-mortar formulation.

The inventors have now found that at least a certain type of superplasticizer, namely (meth)acrylic acid polymers and derivatives thereof, in a relative small amount in combination with cellulose ether if added to a standard dry-mortar formulation effectively improves slip resistance of the dry-mortar formulation without deteriorating the open time and the mechanical strength of the cured dry-mortar formulation.

STATEMENT OF THE INVENTION

In a first aspect of the invention, there is provided a composition for modifying (i.e. modifier composition) a dry-mortar formulation comprising a (meth)acrylic polymer and a cellulose ether, wherein the amount of the (meth)acrylic polymer is 0.05 to 20% based on the weight of the cellulose ether.

In a second aspect of the invention, there is provided the use of a composition comprising a (meth)acrylic polymer and a cellulose ether, wherein the amount of the (meth)acrylic polymer is 0.05 to 20% based on the weight of the cellulose ether, as a modifier composition for a standard dry-mortar formulation.

In a third aspect of the invention, there is provided a modified dry-mortar formulation comprising a standard dry-mortar formulation and a modifier composition, the modifier composition comprising a (meth)acrylic polymer and a cellulose ether, wherein the amount of the (meth)acrylic polymer is 0.05 to 20% based on the weight of the cellulose ether.

In a fourth aspect of the invention, there is provided a method of making a modified dry-mortar formulation comprising the steps of: a) providing a standard dry-mortar formulation, and b) admixing a modifier composition according to the invention to the standard dry-mortar formulation, wherein the compounds of the modifier composition can be admixed individually or in combination to the standard dry-mortar formulation.

In a fifth aspect of the invention, there is provided a method of improving the slip resistance of a dry-mortar formulation without deteriorating the open time and/or the tensile adhesion strength of the dry-mortar formulation when cured comprising the steps of: a) providing a standard dry-mortar formulation, b) admixing a modifier composition according to the invention to the standard dry-mortar formulation, wherein the compounds of the modifier composition can be admixed individually or in combination to the standard dry-mortar formulation, c) admixing water to the modified dry-mortar formulation, and d) processing the water-containing modified dry-mortar formulation in any standard manner. It is surprising that the incorporation of a substance which is known to have a superplasticizing effect, i.e. having the effect of increasing the fluidity of, for example, a binder composition if added to it, and thus normally used as a superplasticizer improves the slip resistance if added in a relative small amount. Furthermore, it was surprising that the addition of a superplasticizer has also no negative effect or even a positive effect on the open time and the mechanical strength of the dry-mortar formulation, especially a cementitious bound tile adhesive, after curing.

Plasticizers, superplasticizers, liquefiers, water reducers or dispersants are additives that disperse binder particles and increase the fluidity of the binder material (cement or gypsum) to which they are added. Their use in formulations for concrete is well known for many years; they are used to reduce the water-cement ratio, to improve the workability, the rheology (pumpability) and the compression strengths of the final product after it hardens. Superplasticizers are also used for wallboards to increase fluidity of the mix, allowing lower use of water and thus reducing energy to dry the board. Superplasticizers are also part of dry-mortar admixtures, e.g. self-leveling underlayments, screeds and troweling compounds to improve workability, smoothness of the surface enabling free-flowing abilities as well as self-healing properties.

Plasticizers and superplasticizers can be selected from natural products like Lignosulfonates, e.g. as powders (Na-, Ca- or Ammonium salts) or liquids, or Casein. They can also be selected from synthetic products. Synthetically produced Superplasticizers belong either to the group of polycondensates, generally been manufactured from sulfonated naphthalene condensate (sulfonate formaldehyde, BNS) or sulfonated melamine formaldehyde (polymelamine-formaldehyde-sulfite, PMS) or polycarboxylate ethers.

The "superplasticizers", namely the (meth)acrylic acid polymers, used in the present invention as compound in the modifier composition are preferably water-soluble or water-dispersible polymers, copolymers or terpolymers. They are preferably poly(meth)acrylic acids or derivatives thereof, or copolymers or terpolymers (or derivatives thereof) of at least (meth)acrylic acid monomers with one or more further ethylenically unsaturated monomers. Also the corresponding salts fall under the term (meth)acrylic acid polymer. The term "(meth)acrylic" means either acrylic or methacrylic or a mixture of both.

The superplasticizers are typically (meth)acrylic acid copolymers, preferably copolymers comprising (meth) acrylic acid (i.e. acrylic acid, methacrylic acid or combinations thereof) and at least one ethylenically unsaturated monomer comprising a polyalkylene oxide unit. More preferably the (meth)acrylic acid copolymers are copolymers of (meth)acrylic acid and at least one type of ethylenically unsaturated monomers comprising a polyalkylene oxide unit and optional further type(s) of ethylenically unsaturated comonomer(s). The term (meth)acrylic acid copolymer includes deprotonated and partially deprotonated forms of the copolymers, i.e. their salts such as their sodium, potassium and ammonium salts.

More specifically, the (meth)acrylic acid copolymer comprises in polymerized form:
(a) one or more (meth)acrylic acid monomers selected from acrylic acid and methacrylic acid;
(b) one or more ethylenically unsaturated polyalkylene oxide monomers according to formula (I):

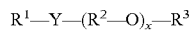

$R^1\text{—}Y\text{—}(R^2\text{—}O)_x\text{—}R^3$ wherein $R^1$ is vinyl, allyl, acryloyl, or methacryloyl, preferably $R^1$ is (meth)acryloyl;
Y is O, S, PH or NH, preferably Y is O;
$R^2$ is $O_2$ to $C_4$ alkylene that can be linear or branched, wherein each $R^2$ can be the same or different within one molecule of $R^1\text{—}Y\text{—}(R^2\text{—}O)_x\text{—}R^3$, preferably $R^2$ is ethylene;
X is an integer from 10 to 500, preferably from 100 to 300; and
$R^3$ is H, an aliphatic (including cycloaliphatic), aromatic or aliphatic-aromatic hydrocarbon radical, preferably $R^3$ is a $C_1$ to $C_{30}$ aliphatic radical or a $C_6$ to $C_{30}$ aromatic radical, more preferably a $C_6$ to $C_{30}$ aromatic radical such as phenyl; and
(c) optionally one or more ethylenically unsaturated comonomers different from monomers (a) and (b), preferably an ethylenically unsaturated comonomer comprising a sulphur-containing moiety such as a sulfonic acid group. An example of a suitable optional comonomer (c) is (meth) allyl sulfonic acid.

Both monomer(s) (a) and (b) may be present in an amount of 1 to 99% by weight each independently on each other, or, for example, 5 to 95% by weight. Preferably, monomer (a) may be present in amount of 10 to 93% by weight. Preferably, monomer (b) may be present in amount of from 1.5 to 30%, by weight. Optional monomer(s) (c) can be present in amount of 0 to 60% by weight, preferably 0 to 30% by weight. The amounts are calculated based on the protonated monomers and the protonated copolymer in question. Preferred (meth) acrylic acid polymers typically have a bulk density of 200 to 600 g/l according to DIN 51757, and a pH of 5.5 to 8.5 measured in 5%-solution in water according to DGF H-III1. Commercially available examples of such (meth)acrylic acid polymers are polymers of the Mighty® series (Kao Chemicals), especially Mighty® 21 PSN, comprising a copolymer of methacrylic acid or its salt and an aryl terminated polyethylenglycol methacrylate, wherein the polyethylenglycol unit has about 170 units, and Mighty® 21 PSD.

As mentioned above, the amount of the (meth)acrylic acid polymer present in the modifier composition according to the invention is in the range of 0.05 to 20%, based on the weight of the cellulose ether. A preferred range of the amount of the (meth)acrylic acid polymer is 0.1 to 10%, more preferably 0.3 to 5%, most preferably 0.5 to 4%, based on the weight of the cellulose ether.

The cellulose ether present in the modifier composition according to the invention is preferably selected from the group comprising alkylcelluloses, hydroxyalkylcelluloses or alkylhydroxyalkylcelluloses, optionally each with two or more different alkyl and/or hydroxyalkyl substituents, or mixtures of two or more of the before mentioned cellulose derivatives.

Alternatively, or additionally, the composition according to the invention may comprise one or more water-soluble or at least water-swellable polysaccharides as, for example, pectin, guar gum, guar derivatives like guar ethers, gum arabic, xanthan gum, cold-water-soluble starch, starch derivatives like starch ethers, and/or chitin. Cellulose ether and these compounds act as water retention aid and as rheological modifier (thickener). In accordance with the present invention, both ionic and nonionic polysaccharides or their derivatives, in particular cellulose ethers, having a thermal flocculation point and those without a thermal flocculation point may be used.

The following is a list of preferred examples of cellulose ethers which can be used in context with the invention: hydroxyalkylcelluloses {e.g., hydroxyethylcellulose (HEC), hydroxypropylcellulose (HPC) and hydroxypropylhydroxyethylcellulose (HPHEC)}; carboxy-alkylcelluloses {e.g., carboxymethylcellulose (CMC)}; carboxyalkylhydroxyalkylcelluloses {carboxymethylhydroxyethylcellulose (CM-HEC) and carboxymethyl-hydroxypropylcellulose (CM-HPC)}; sulphoalkylcelluloses {e.g., sulphoethylcellulose (SEC) and sulphopropylcellulose (SPC)}; carboxyalkylsulphoalkylcelluloses {e.g., carboxymethylsulphoethylcellulose (CMSEC) and carboxymethylsulphopropylcellulose (CMSPC)}; hydroxyalkylsulphoalkylcelluloses {e.g., hydroxyethylsulphoethylcellulose (HESEC), hydroxypropylsulphoethylcellulose (HPSEC) and hydroxyethylhyd-roxypropylsulphoethylcellulose (HEHPSEC)}; alkylhydroxyalkylsulphoalkylcelluloses {e.g., methylhydroxyethylsulphoethylcellulose (MHESEC), methylhydroxypropylsulphoethylcellulose (MHPSEC) and methylhydroxyethylhydroxypropylsulphoethylcellulose (MHEHPSEC)}; alkylcelluloses {e.g., methylcellulose (MC) and ethylcellulose (EC)}; binary or ternary alkylhydroxyalkylcellulose {e.g., methylhydroxyethylcellulose (MHEC), ethylhydroxyethylcellulose (EHEC), methylhydroxypropylcellulose (MHPC) and ethylhydroxypropylcellulose (EHPC)}; ethylmethylhydroxyethylcellulose (EMHEC)}; ethylmethylhydroxypropylcellulose (EMHPC)}; alkenylcelluloses and ionic and nonionic alkenylcellulose mixed ethers {e.g., allylcellulose, allylmethylcellulose, allylethylcellulose and carboxy-methylallylcellulose)}; dialkylaminoalkylcelluloses {e.g., N,N-dimethylaminoethylcellulose and N,N-diethylaminoethylcellulose}; dialkylaminoalkylhydroxyalkylcelluloses {e.g., N,N-dimethylaminoethylhydroxyethylcellulose and N,N-dimethylaminoethylhydroxypropylcellulose}; aryl- and arylalkyl- and arylhydroxyalkylcelluloses {e.g., benzylcellulose, methylbenzylcellulose and benzylhydroxyethylcellulose}; as well as reaction products of the above-stated cellulose ethers with hydrophobically modified glycidyl ethers, which have alkyl residues with C3 to C15 carbon atoms or arylalkyl residues with C7 to C15 carbon atoms. Particularly preferred polysaccharides or polysaccharide derivatives are cellulose derivatives, in particular water- and/or organo-soluble cellulose ethers, such as for example methylcellulose ether (MC), ethylcellulose ether (EC), carboxymethylcellulose ether (CMC) {preferably salts thereof, such as for example sodium carboxymethylcellulose ether}, methylhydroxyethylcellulose (MHEC), methyl hydroxypropylcellulose (MHPC), ethylhydroxyethylcellulose (EHEC), ethylhydroxypropylcellulose (EHPC), methylhydroxyethylhydroxypropylcellulose (MHEHPC), hydroxyethylcellulose (HEC) and hydroxypropylcellulose (HPC) as well as reaction products of the above-recited cellulose ethers with reagents which contain long-chain linear or branched alkyl groups with C2 to C18 carbon atoms or arylalkyl groups with C7 to C15 carbon atoms.

The composition for modifying a dry mortar formulation may—under limited circumstances—additionally comprise one or more compounds selected from the group of pozzolans. A "pozzolan" as used here refers to silica-containing or silica- and alumina-containing natural or synthetic materials which are not themselves able to act as binders but together with water and lime form water-insoluble compounds having cement-like properties. A distinction is made between natural and synthetic pozzolanas. Natural pozzolans include iglass-rich ashes and rocks of volcanic origin, for example pumice, trass (finely milled tuff), Santorin earth, kieselguhr, hornstones (silica rocks), chert and moler earth. Synthetic pozzolanas include fired, ground clay (ground brick), fly ashes such as ash from a coal-fired power station, silica dust, oil shale ash (oil shale=bituminous lime-containing shale), and calcined kaolin (metakaolin). If used, preferred pozzolans are selected from the group consisting of pumice, trass, Santorin earth, kieselguhr, hornstones, chert, moler earth ground, brick, fly ash, silica dust, oil shale ash, and metakaolin. If added to the composition of the invention the amount of the pozzolan(s) should be—in order to be effective—dosed in a way that pozzolan(s) are present in the final dry mortar in an amount of at least 0.5 wt.-% based on the dry mortar.

The composition for modifying a dry mortar formulation may also additionally comprise natural and/or synthetic thickeners like Polyacrylamide (PAA) and/or starch ethers. If added to the composition of the invention the amount of synthetic thickeners like PAA can be in the range of 0.01 to 10% based on the weight of cellulose ether. In case of starch ethers as natural thickener the amount can be in the range of 10 to 50% based on the weight of cellulose ether.

The composition according to the invention may additionally comprise one or more water-redispersible polymer powder(s). The use of such water-redispersible polymer powders in dry-mix mortars is common and known to improve, depending on the type and addition rate, the adhesion on all kind of substrates, the deformability of the mortars, the flexural strength and the abrasion resistance, to name only a few of several properties. The polymer powder can comprises one or more compounds selected from homopolymers and/or copolymers and/or terpolymers of one or monomers selected from the group of vinyl esters of unbranched or branched $C_1$-$C_{15}$-alkycarboxylic acids, (meth)acrylic ester of $C_1$-$C_{15}$-alcohols, vinylaromatics, olefins, dienes, and vinyl halogenides. Water-redispersible polymer powders are produced by spray-drying techniques of water-based dispersions based on, for example, the above mentioned homopolymers and/or copolymers. The water-redispersible polymer powder may comprise one or more compounds selected from protective colloids and antiblocking agents. EP1498446A1 discloses methods and examples of producing such water-redispersible polymer powders. If added to the composition of the invention the amount of water-redispersible polymer powder(s) can be up to 50% based on the weight of the cellulose ether. If added to the composition of the invention the amount of redispersible polymer powder(s) should be—in order to be effective—dosed in a way that redispersible polymer powder(s) are present in the final dry mortar in an amount of at least 0.5 up to 25 wt.-% based on the dry mortar. Recalculated with respect to the modifier composition this means that the amount of redispersible polymer powder(s) in the modifier composition can be in the range of 100 up to 1000 wt.-% or more relative to the cellulose ether.

It is preferred that the compounds of the additive composition according to the present invention are comprised in the composition "as distinct particulate compounds". This means that the essential and, preferably, also the optional additional compounds mentioned above are blended in any order to give a particulate blend comprising said compounds. Preferably, the compounds are provided in separated form prior to blending. However, it is not necessary that the compounds are provided in pure form, each compound can also be provided as composition comprising additional optional ingredients. Decisive for the understanding of the term "as distinct particulate compounds" is that the compounds have not reacted with each other before blending and will not react with each other in the absence of water. It also means that none of the compounds is embedded in a (polymer) matrix of one of the other compounds.

The modifier composition according to the invention is especially intended to be used in dry mortar formulations, e.g. hand or machine applied gypsum plaster, cement renders, water proofing membranes, mineral coatings for insulation systems like ETICS. The composition can be admixed to the components of the dry mortar formulation when manufacturing the dry mortar formulation. Alternatively, the composition according to the invention may be added later to a standard dry mortar formulation not initially containing the modifier composition according to the invention. So, subject matter of the present invention is also the composition for modifying a dry mortar formulation if packaged in one single package unit. Such a single package unit may be sold separately from standard dry mortar formulation.

In an alternative embodiment of the present invention at least one compound from the composition is packaged separately in a first package unit while the remaining compounds from the composition are packaged in a second package unit. This is a kind of kit comprising at least two different compounds or compositions each packaged in at least one package unit, wherein the sum of the compounds or compositions packaged in the package units corresponds to the modifier composition of the invention as described above. The two or more package units may be sold separately from a standard dry mortar formulation. For example, one embodiment of the kit can be the following: The cellulose ether is packaged in at least one of the package units and the (meth)acrylic acid polymer is packaged in at least one of the package unit not comrising the cellulose ether.

A further subject-matter of the present invention is the use of the composition as a modifier composition for a standard dry mortar formulation. Standard dry mortar formulations to which the inventive modifier composition may be added comprises at least cement. Further ingredients may be added dependent on the intended use and as known to the person skilled in the art.

As already mentioned above the modified dry mortar formulation according to the present invention comprises a standard dry mortar formulation and the modifier composition as specified in detail above. Preferably, the modifier composition is present in an amount of 0.05 to 15%, preferably 0.1 to 10%, and more preferably 0.2 to 1%, based on the weight of the modified dry mortar formulation.

The present invention also provides a method of making a modified dry mortar formulation. The method of making comprises the steps of: a) providing a standard dry mortar formulation, and b) admixing a modifier composition as specified in detail above to the standard dry mortar formulation, wherein the compounds of the modifier composition can be admixed individually or in combination to the standard dry mortar formulation. Preferably, the modifier composition is present in an amount of 0.05 to 15%, preferably 0.1 to 10%, and more preferably 0.2 to 1%, based on the weight of the modified dry mortar formulation.

When preparing the modified dry mortar formulation according to the invention the relative amounts of the mandatory and optional compounds in the modifier composition should be adapted to the total amounts needed in the final modified dry mortar formulation. It is within the knowledge of a person skilled in the art to prepare a modifier composition with appropriate amounts of mandatory and optional compounds in the light of the amounts of the compounds already present in the standard dry mortar formulation. For example, in case the standard dry mortar formulation already comprises puzzolan(s) additional amounts of puzzolan(s) need not necessarily be added to the modifier composition according to the present invention. The total amounts of the various compounds in the final modified dry mortar formulation should be in appropriate ranges which can be identified by the person skilled in the art based on his knowledge and routine tests. For example, if water-redispersible polymer powder(s) are added to the modifier composition according to the invention the amounts of all compounds in the modifier compounds and the amount of the modifier composition added to the standard dry mortar formulation should be adjusted like that the amount of the water-redispersible polymer powder(s) in the final modified dry mortar formulation is at least 0.5% by weight since less amounts of a water-redispersible polymer powder in a dry mortar formulation is normally not effective.

Finally, and as mentioned above the present invention provides a method of improving the slip resistance of a dry mortar formulation without deteriorating the open time and/or the tensile adhesion strength of the dry mortar formulation when cured. The method of improving the slip resistance comprises the steps of: a) providing a standard dry mortar formulation, b) admixing a modifier composition as specified in detail above to the standard dry mortar formulation, wherein the compounds of the modifier composition can be admixed individually or in combination to the standard dry mortar formulation, c) admixing water to the modified dry mortar formulation, and d) processing the water-containing modified dry mortar formulation in any standard manner. Preferably, the modifier composition is present in an amount of 0.05 to 15%, preferably 0.1 to 10%, and more preferably 0.2 to 1%, based on the weight of the modified dry mortar formulation.

Preferably, in step b) in both of the above mentioned methods the compounds of the modifier composition are admixed in combination in form of a pre-prepared composition, the pre-preparation comprises the step of blending the dry particulate compounds in any order.

In the below following Examples a standard and modified dry mortar formulations according to the invention were tested in respect of some of their properties, namely their slip resistance, tensile adhesion strength and open time. In this context the following background information are given:

In Europe the standards DIN EN 12004 and DIN EN 12002 (International standard ISO 13007) define the various performance criteria for adhesives for tiles. The norm EN 12004 specifies the values of performance requirements for all ceramic tile adhesives, i.e. cementitious (C), dispersion (D) and reaction resin (R) adhesives. Each type can be divided into two classes with either normal (type 1) or improved (type 2) properties. The norm DIN EN 12002 defines the deformability of cementitious mortars and grouts.

Cementitious tile adhesives (C) are rated and classified in terms of tensile adhesion strength (DIN EN 12004) and deformability (DIN EN 12002). Tensile adhesion strength is tested for four different storage conditions. Depending on the requirements cementitious tile adhesives are either classified as C1 to achieve minimum values of 0.5 N/mm$^2$ or as C2 with adhesion strengths of at least 1.0 N/mm$^2$ respectively. This classification goes along with additional characteristics: F=mortar with accelerated setting, T=mortar with reduced slip, E=mortar with extended open time, and S=deformable (S1) or highly deformable adhesive (S2).

The introduction of the European Norm EN 12004 and EN 12002 has led to quality categories for cement based tile adhesives of classes C1 and C2 for slip resistance, adhesion strength, open time and transverse deformation (classes S1 and S2). The technical requirements for cementitious tile adhesives specified according to EN 12004 and EN 12002 are outlined in table 1.

Apart from high adhesion strengths after different storage conditions the open time is an important factor and is defined in the test standard EN 1346 as maximum time interval after application at which tiles can be embedded in the applied adhesive and meet the specified tensile adhesion strength requirement. The maximum open time of a mortar refers to the latest time a tile can be laid in without a major loss in final adhesion strength. After 28 days the pull off strength is determined with a minimum requirement of 0.5 N/mm$^2$ after not less than 20 minutes embedding time for standard adhesives; at least 0.5 N/mm$^2$ after not less than 10 minutes embedding time for fast-setting mortars and at least 0.5 N/mm$^2$ after not less than 30 minutes embedding time for high quality tile adhesives are required. According to the EN-standard the minimum requirement for the extended open time is raised from 0.5 N/mm$^2$ after 20 min for a standard open time to 30 minutes for the adhesive with extended open time.

TABLE 1

Cementitious tile adhesives specified according to EN 12004 and EN 12002

| Class | Tensile adhesion strength [N/mm$^2$] | Deformability [mm] | Open time [N/mm$^2$] after embedding time | | | Adhesion strength after 6 h [N/mm$^2$] | Slip [mm] |
|---|---|---|---|---|---|---|---|
| | | | 10 min | 20 min | 30 min | | |
| C1 | ≥0.5 | | | ≥0.5 | | | |
| C1S1 | ≥0.5 | ≥2.5 | | ≥0.5 | | | |
| C1E | ≥0.5 | | | | ≥0.5 | | |
| C1T | ≥0.5 | | | ≥0.5 | | | ≥0.5 |
| C1F | ≥0.5 | | ≥0.5 | | | ≥0.5 | |
| C1ET | ≥0.5 | | | | ≥0.5 | | ≥0.5 |
| C1FT | ≥0.5 | | ≥0.5 | | | ≥0.5 | ≥0.5 |
| C2 | ≥1.0 | | | ≥0.5 | | | |
| C2S2 | ≥1.0 | ≥5.0 | | ≥0.5 | | | |
| C2E | ≥1.0 | | | | ≥0.5 | | |

TABLE 1-continued

Cementitious tile adhesives specified according to EN 12004 and EN 12002

| Class | Tensile adhesion strength [N/mm$^2$] | De-form-ability [mm] | Open time [N/mm$^2$] after embedding time | | | Adhesion strength | |
|---|---|---|---|---|---|---|---|
| | | | 10 min | 20 min | 30 min | after 6 h [N/mm$^2$] | Slip [mm] |
| C2T | ≥1.0 | | | ≥0.5 | | | ≥0.5 |
| C2F | ≥1.0 | ≥0.5 | | | | ≥0.5 | |
| C2ET | ≥1.0 | | | ≥0.5 | | | ≥0.5 |
| C2FT | ≥1.0 | ≥0.5 | | | | ≥0.5 | ≥0.5 |

1) Storage conditions according to EN 12004 as follows: Standard = 28 d at 23° C.; Water = 7 d at 23° C. + 21 d water immersion; Heat = 14 at 23° C. + 14 d 70° C. + 1 d 23° C.; Frost = 7 d at 23° C. + 21 d water immersion + 25 frost-thaw-cycles < acc. to EN 1348; four storage conditions (heat and frost-thaw conditioning optional; labelling as "NPD = No Performance Determined")
2) According to EN 12002

EXAMPLES

The performance of a cementitious tile adhesive according to the invention has been studied by comparing formulations with and without substituting a portion of the cellulose ether by a (meth)acrylic based polymer.

In Table 1 tested formulations as reference and according to the invention are summarized.

The formulations comprise as base composition: 35 wt.-% Ordinary Portland Cement CEM I 52.5 R (Milke, Germany), 31.05 wt.-% Silica sand F 32 (Quarzwerke Frechen, Germany), 31.10 wt.-% Silica sand F 36 (Quarzwerke Frechen, Germany), 2.0 wt.-% redispersible powder (DLP 2000, DWC, Germany) and 0.4 wt.-% Arbocel BWW 40 (cellulose fibres, Rettenmaier, Germany).

Additionally, the formulations comprise 0.45 wt.-% of a cellulose ether (Walocel MKX 6000 PPV, Dow Wolff Cellulosics, Germany) or cellulose ether composition consisting of a cellulose ether (Walocel MKX 6000 PPV) and a (meth)acrylic polymer comprising a copolymer of methacrylic acid or its salt and an aryl terminated polyethylenglycol methacrylate, wherein the polyethylenglycol unit has about 170 units (Mighty 21 PSN, KAO, Japan) as given in table 2.

The water/solid ratio for the formulations is being fixed according to the consistency. For details of water/solid ratio and viscosity (Brookfield RVT, Spindle 96, 5 rpm, 23° C.) see table 1.

The tests were conducted according to the norm EN 12004 with EN 1346 as sub norm for the open time and EN 1348 as sub norm for the adhesion strengths.

The results clearly show that the use of a (meth)acrylic polymer can favourably be used as a substitute for a portion of cellulose ether to achieve the required performance in terms of improved slip resistance without deteriorating or even improving other key properties like and open times and adhesion strength.

TABLE 2

Comparative and inventive formulations and results

| | Comparative | Invention |
|---|---|---|
| Portland cement 52.5 R [wt.-%] | 35.00 | 35.00 |
| quartz sand F32 [wt.-%] | 31.05 | 31.05 |
| quartz sand F36 [wt.-%] | 31.10 | 31.10 |
| DLP 2000 [wt.-%] | 2.00 | 2.00 |
| fibres Arbocel BWW40 | 0.40 | 0.40 |

TABLE 2-continued

Comparative and inventive formulations and results

| | Comparative | Invention |
|---|---|---|
| [wt.-%] | | |
| cellulose ether comp.:[1] [wt.-%] | 0.45 | 0.45 |
| Walocel [wt.-%] | 0.45 | 0.4455 |
| Mighty 21 PSN [wt.-%] | | 0.0045 |
| water/solid ratio | 0.215 | 0.21 |
| viscosity [pa * s] | 603 | 603 |
| slip resistance EN 1308 [mm] | 5.40 | 1.05 |
| adhesion EN 1348 [N/mm$^2$] | | |
| norm climate storage open time EN 1346 [N/mm$^2$] | 0.69 | 0.75 |
| 20 min. | 0.75 | 0.94 |
| 30 min. | 0.36 | 0.74 |

[1]The "cellulose ether composition" consists of one or more of the following compounds as specified in the table: Walocel is a methylcellulose (Walocel MKX 6000 PPV, Dow Wolff Cellulosics), Migthy 21 PSN is a copolymer of methacrylic acid or its salt and an aryl terminated polyethylenglycol methacrylate, wherein the polyethylenglycol unit has about 170 units.

The invention claimed is:

1. A modified dry mortar formulation comprising a cement and a composition for modifying a dry mortar formulation in an amount of 0.05 to 15% based on the weight of the modified dry mortar formulation, the composition for modifying a dry mortar formulation comprising a (meth)acrylic acid polymer and a cellulose ether, wherein the (meth)acrylic acid polymer is a copolymer comprising (meth)acrylic acid and at least one ethylenically unsaturated monomer comprising a polyalkylene oxide unit and wherein the amount of (meth)acrylic acid polymer is 0.05 to 20 percent based on the weight of the cellulose ether.

2. A method of making the modified dry mortar formulation of claim 1, the method comprising the steps of:
   a) providing the cement, and
   b) admixing the composition for modifying a dry mortar formulation comprising a (meth)acrylic acid polymer and a cellulose ether, wherein the (meth)acrylic acid polymer is a copolymer comprising (meth)acrylic acid and at least one ethylenically unsaturated monomer comprising a polyalkylene oxide unit, and wherein the amount of (meth)acrylic acid polymer is 0.05 to 20 percent based on the weight of the cellulose ether, to the cement in an amount of 0.05 to 15% based on the weight of the modified dry mortar formulation.

3. A method of improving the slip resistance of a dry mortar formulation without deteriorating the open time and/or the tensile adhesion strength of the dry mortar formulation when cured comprising the steps of:
   a) providing a cement,
   b) admixing a composition for modifying a dry mortar formulation comprising a (meth)acrylic acid polymer and a cellulose ether, wherein the (meth)acrylic acid polymer is a copolymer comprising (meth)acrylic acid and at least one ethylenically unsaturated monomer comprising a polyalkylene oxide unit, and wherein the amount of (meth)acrylic acid polymer is 0.05 to 20 percent based on the weight of the cellulose ether, to the cement in an amount of 0.05 to 15% based on the weight of the modified dry mortar formulation,
   c) admixing water to the modified dry mortar formulation, and
   d) processing the water-containing modified dry mortar formulation.

4. The modified dry mortar formulation of claim 1, further characterized by the amount of (meth)acrylic polymer being 0.1 to 10 percent based on the weight of the cellulose ether.

5. The modified dry mortar formulation of claim 1, further characterized by the (meth)acrylic acid copolymer comprising in polymerized form:
   (a) one or more (meth)acrylic acid monomers selected from acrylic acid and methacrylic acid;
   (b) one or more ethylenically unsaturated polyalkylene oxide monomers according to formula (I):

$R^1—Y—(R^2—O)_x—R^3$ wherein $R^1$ is vinyl, allyl, acryloyl, or methacryloyl;
   Y is O, S, PH or NH;
   $R^2$ is $C_2$ to $C_4$ alkylene that can be linear or branched, wherein each $R^2$ can be the same or different within one molecule of $R^1—Y—(R^2—O)_x—R^3$;
   X is an integer from 10 to 500; and
   $R^3$ is H, an aliphatic, aromatic or aliphatic-aromatic hydrocarbon radical; and
   (c) optionally one or more ethylenically unsaturated comonomers different from monomers (a) and (b).

6. The modified dry mortar formulation of claim 5, further characterized by $R^1$ being a methacryloyl, Y being O, $R^2$ being ethylene, X being an integer from 100 to 300 and $R^3$ being a $C_1$ to $C_{30}$ aliphatic radical or a $C_6$ to $C_{30}$ aromatic radical.

7. The modified dry mortar formulation of claim 1, further characterized by the cellulose ether being selected from the group consisting of alkylcelluloses, hydroxyalkylcelluloses and alkylhydroxyalkylcelluloses.

* * * * *